United States Patent
Choi

(10) Patent No.: US 11,437,030 B2
(45) Date of Patent: Sep. 6, 2022

(54) ELECTRONIC APPARATUS AND METHOD FOR VOICE RECOGNITION

(71) Applicant: SAMSUNG ELECTRONICS CO., LTD., Suwon-si (KR)

(72) Inventor: Chan-hee Choi, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 18 days.

(21) Appl. No.: 16/162,996

(22) Filed: Oct. 17, 2018

(65) Prior Publication Data
US 2019/0115025 A1    Apr. 18, 2019

(30) Foreign Application Priority Data

Oct. 17, 2017   (KR) .................. 10-2017-0134572

(51) Int. Cl.
| | | |
|---|---|---|
| *G10L 15/22* | (2006.01) | |
| *G10L 15/30* | (2013.01) | |
| *G06F 3/16* | (2006.01) | |
| *G10L 17/02* | (2013.01) | |
| *G10L 15/00* | (2013.01) | |
| *G10L 15/26* | (2006.01) | |

(52) U.S. Cl.
CPC .............. *G10L 15/22* (2013.01); *G06F 3/167* (2013.01); *G10L 15/00* (2013.01); *G10L 15/30* (2013.01); *G10L 17/02* (2013.01); *G10L 15/26* (2013.01); *G10L 2015/223* (2013.01)

(58) Field of Classification Search
None
See application file for complete search history.

(56) References Cited

U.S. PATENT DOCUMENTS

| | | |
|---|---|---|
| 7,159,020 B2 | 1/2007 | Ibaraki |
| 9,484,029 B2 | 11/2016 | Jung et al. |
| 9,619,200 B2 | 4/2017 | Chakladar et al. |
| 9,779,734 B2 | 10/2017 | Lee |
| 9,812,126 B2 | 11/2017 | Khan et al. |
| 10,271,093 B1* | 4/2019 | Jobanputra ......... G06F 16/3329 |

(Continued)

FOREIGN PATENT DOCUMENTS

| | | |
|---|---|---|
| EP | 2 680 596 A1 | 1/2014 |
| JP | 2017-107333 A | 6/2017 |

(Continued)

OTHER PUBLICATIONS

International Search Report dated Feb. 14, 2019 issued by the International Searching Authority in counterpart International Application No. PCT/KR2018/012265 (PCT/ISA/210).

(Continued)

*Primary Examiner* — Jonathan C Kim
(74) *Attorney, Agent, or Firm* — Sughrue Mion, PLLC

(57) ABSTRACT

Selectively performing voice recognition using one device among multiple devices that recognize and execute the voice recognition based on at least one of apparatus information of the multiple devices and a function parsed from a result of the voice recognition. Thereby, only a single preferable device in an environment in which multiple devices exist, which can service the user input via voice recognition, actually responds to the voice input and services the voice input of the user.

10 Claims, 11 Drawing Sheets

(56) References Cited

U.S. PATENT DOCUMENTS

| | | | | |
|---|---|---|---|---|
| 2013/0073293 | A1* | 3/2013 | Jang | G10L 15/22 |
| | | | | 704/E21.001 |
| 2013/0183944 | A1* | 7/2013 | Mozer | H04L 12/2818 |
| | | | | 455/414.1 |
| 2013/0238326 | A1* | 9/2013 | Kim | G10L 21/02 |
| | | | | 704/E15.001 |
| 2015/0170664 | A1* | 6/2015 | Doherty | G08C 17/00 |
| | | | | 704/275 |
| 2015/0279356 | A1* | 10/2015 | Lee | G10L 15/32 |
| | | | | 704/251 |
| 2015/0302857 | A1* | 10/2015 | Yamada | G10L 15/22 |
| | | | | 704/275 |
| 2015/0370531 | A1* | 12/2015 | Faaborg | G06F 3/162 |
| | | | | 704/275 |
| 2016/0155443 | A1* | 6/2016 | Khan | G06F 3/147 |
| | | | | 704/275 |
| 2016/0240194 | A1 | 8/2016 | Lee et al. | |
| 2016/0284350 | A1* | 9/2016 | Yun | G06F 3/167 |
| 2017/0032783 | A1* | 2/2017 | Lord | G06F 3/167 |
| 2017/0053650 | A1* | 2/2017 | Ogawa | G10L 15/08 |
| 2017/0083285 | A1* | 3/2017 | Meyers | G10L 15/00 |
| 2017/0206896 | A1 | 7/2017 | Ko et al. | |
| 2018/0122378 | A1* | 5/2018 | Mixter | H04L 67/306 |
| 2018/0137860 | A1* | 5/2018 | Koyama | G10L 15/00 |
| 2018/0182399 | A1* | 6/2018 | Suyama | G10L 15/22 |
| 2018/0288104 | A1* | 10/2018 | Padilla | H04L 65/1069 |
| 2019/0066670 | A1* | 2/2019 | White | G10L 25/84 |

FOREIGN PATENT DOCUMENTS

| | | |
|---|---|---|
| KR | 10-0449113 B1 | 9/2004 |
| KR | 10-2013-0133629 A | 12/2013 |
| KR | 10-2015-0113701 A | 10/2015 |
| KR | 10-2016-0014465 A | 2/2016 |
| KR | 10-2016-0100765 A | 8/2016 |
| KR | 10-2016-0110085 A | 9/2016 |
| KR | 10-2017-0088982 A | 8/2017 |
| WO | 2010/025440 A2 | 3/2010 |

OTHER PUBLICATIONS

Written Opinion dated Feb. 14, 2019 issued by the International Searching Authority in counterpart International Application No. PCT/KR2018/012265 (PCT/ISA/237).

Communication dated Feb. 25, 2019 issued by the European Intellectual Property Office in counterpart European Application No. 18200652.8.

Communication dated May 15, 2020 issued by the European Patent Office in European Patent Application No. 18200652.8.

Communication dated Oct. 15, 2021 by the Korean Intellectual Property Office in Korean Patent Application No. 10-2017-0134572.

Communication dated Apr. 28, 2022 by the Korean Intellectual Property Office in Korean Patent Application No. 10-2017-0134572.

* cited by examiner

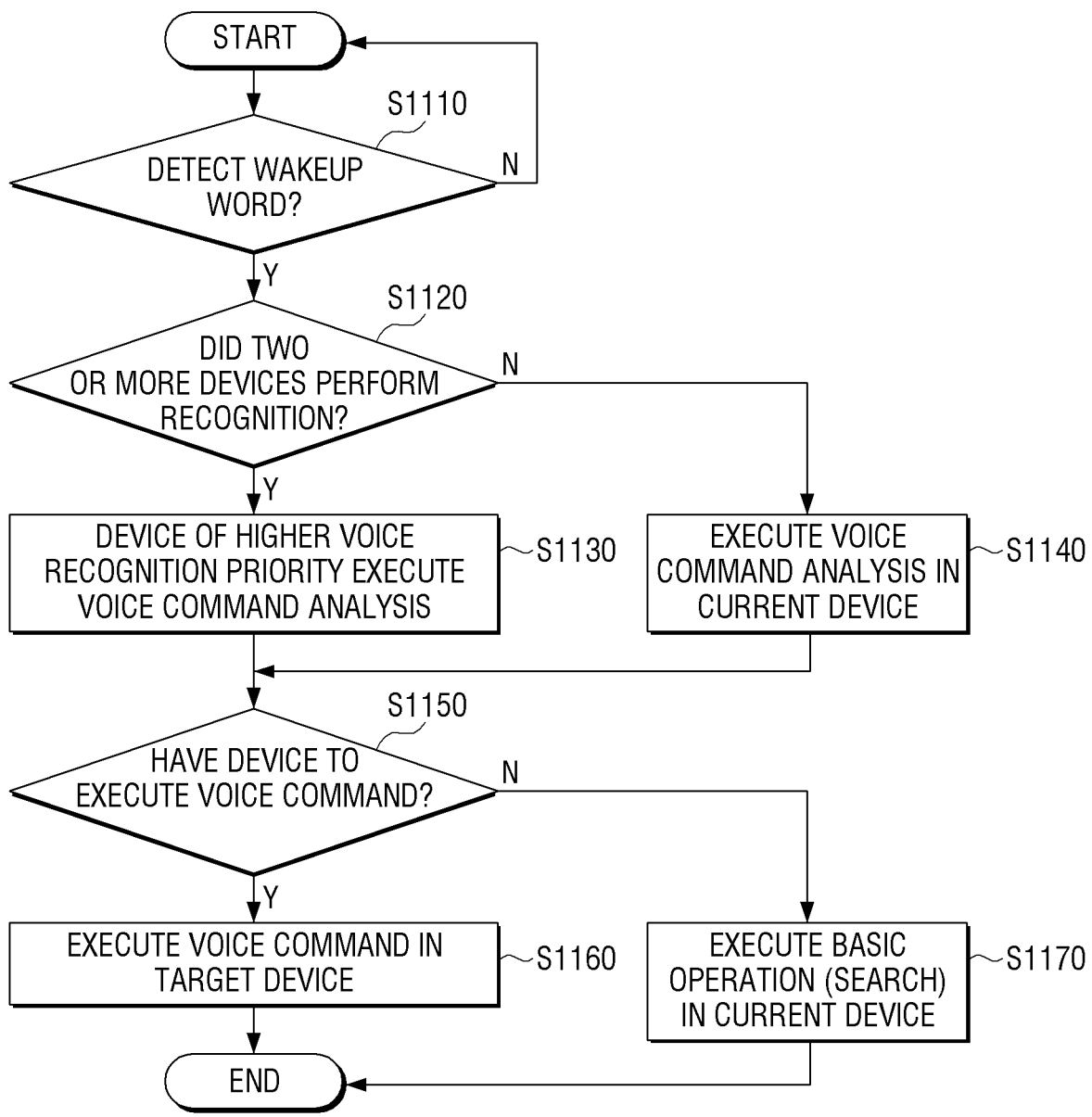

ELECTRONIC APPARATUS AND METHOD FOR VOICE RECOGNITION

CROSS-REFERENCE TO RELATED APPLICATIONS

This application is based on and claims priority under 35 U.S.C. § 119(a) from Korean Patent Application No. 10-2017-0134572, filed on Oct. 17, 2017, in the Korean Intellectual Property Office, and the disclosure of which is incorporated by reference herein in its entirety.

BACKGROUND

1. Field

The disclosure relates to an electronic apparatus and a method for voice recognition. More particularly, the disclosure relates to an electronic apparatus that automatically determines an electronic apparatus to be controlled using voice recognition, from among a plurality of electronic apparatuses that are capable of voice recognition, and a method for voice recognition.

2. Description of Related Art

An electronic apparatus is an apparatus for performing a variety of functions according to control commands of a user. Recently, electronic apparatuses have received input of control commands through an input apparatus such as a keypad, a remote controller and the like. Additionally, electronic apparatuses have also adopted a voice recognition function for receiving input of control commands through a user voice.

Voice recognition functionality has been implemented in various manners. For example, a method of activating a voice recognition function in a case that a user presses a particular button, a method of a user uttering a particular wake up word (WUW) (e.g., Bixby), and a method of activating a voice recognition function in response to user input, such as the particular wake up word (WUW), etc. have been implemented.

If a plurality of electronic apparatuses having voice recognition functionality in response to the particular wake up word (WUW) are present in one space, a voice recognition function may simultaneously be activated in all of the plurality of electronic apparatuses. Moreover, the plurality of electronic apparatuses may each individually perform an action according to the voice recognition function of the recognized user control command.

However, a user may provide a command by voice recognition for the purpose of performing a particular function in only a specific apparatus. Thus, there has been a demand for a method in which performing a function according to a voice recognition function is possible in only an apparatus to be controlled by a user according to the user's intention.

The above information is presented as background information only to assist with an understanding of the disclosure. No determination has been made, and no assertion is made, as to whether any of the above might be applicable as prior art with regard to the disclosure.

SUMMARY

Aspects of the disclosure may address at least the above-mentioned problems and/or disadvantages and to provide at least the advantages described below. Accordingly, an aspect of the disclosure may provide an electronic apparatus for automatically determining an electronic apparatus to be controlled using voice recognition, from among a plurality of electronic apparatuses which are capable of voice recognition, and a method for voice recognition.

In accordance with an aspect of the disclosure, there is provided an electronic apparatus including a communicator, a microphone configured to receive a voice input, and a processor configured to perform a voice recognition corresponding to the voice input received through the microphone, to identify a target apparatus based on at least one from among apparatus information and function information included in a result of the performed voice recognition, and to control the communicator to transmit a control command corresponding to the voice recognition result to the target apparatus.

The electronic apparatus may further include a memory configured to store apparatus information of the electronic apparatus and apparatus information of a second electronic apparatus capable of communicating with the electronic apparatus. The processor may be configured to identify the target apparatus from among the electronic apparatus and the second electronic apparatus based on at least one from among the apparatus information and function information included in the result of the performed voice recognition.

The processor may be configured to, based on the voice recognition result, identify the target apparatus corresponding to the apparatus information from among the electronic apparatus and the second electronic apparatus.

The processor may be configured to, based on the voice recognition result, identify a target apparatus capable of performing a function corresponding to the function information based on the apparatus information of the electronic apparatus and apparatus information of the second electronic apparatus.

The processor may be configured to, based on a plurality of target apparatuses being capable of performing the function, identify one target apparatus based on history information of the plurality of target apparatuses.

The processor may be configured to identify one target apparatus from among the plurality of apparatuses based on voice recognition history information performed in each of the plurality of target apparatuses.

The processor may be configured to identify one target apparatus from among the plurality of apparatuses based on current time information and history information.

The processor may be configured to, based on a plurality of target apparatuses being capable of performing the function, identify the target apparatus from among the plurality of target apparatuses based on a predetermined priority.

The processor may be configured to update the apparatus information of the electronic apparatus and apparatus information of the second electronic apparatus at a predetermined time.

The processor may be configured to, based on the target apparatus being the electronic apparatus, perform a function corresponding to the voice recognition result.

The processor may be configured to, based on the target apparatus being the electronic apparatus and a control command being received from another electronic apparatus, compare the voice recognition result with the received control command and determine whether to additionally perform a function according to the received control command.

The processor may be configured to, based on a wake up word (WUW) in a voice input through the microphone being received, perform a voice recognition for the voice input through the microphone.

The processor may be configured to control the communicator to transmit the voice input received through the microphone to a server; and identify a target apparatus by using a voice recognition result of the voice received from the server.

In accordance with an aspect of the disclosure, there is provided a method for voice recognition in an electronic apparatus including performing a voice recognition corresponding to a voice input, identifying a target apparatus based on at least one from among apparatus information and function information included in a result of the performed voice recognition; and transmitting a control command corresponding to the voice recognition result to the target apparatus.

The identifying may include identifying a target apparatus from among the electronic apparatus and a second electronic apparatus capable of communicating with the electronic apparatus based on at least one from among the apparatus information and function information included in the result of the performed voice recognition.

The identifying may include, based on the voice recognition result, identifying the target apparatus corresponding to the apparatus information from among the electronic apparatus and the second electronic apparatus.

The identifying may include, based on the voice recognition result, identifying a target apparatus capable of performing a function corresponding to the function information based on the apparatus information of the electronic apparatus and apparatus information of the second electronic apparatus.

The identifying may include, based on a plurality of target apparatuses being capable of performing the function, identifying one target apparatus based on history information of the electronic apparatus and the plurality of target apparatuses.

The identifying may include, based on a plurality of target apparatuses being capable of performing the function, identifying the target apparatus from among the plurality of target apparatuses based on a predetermined priority.

In accordance with an aspect of the disclosure, there is provided a computer-readable recording medium configured to store one or more programs for executing a method for voice recognition in an electronic apparatus including performing a voice recognition corresponding to a voice input, identifying a target apparatus based on at least one from among apparatus information and function information included in a result of the performed voice recognition; and transmitting a control command corresponding to the voice recognition result to the target apparatus.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, and advantages of certain embodiments of the disclosure will be more apparent from the following description taken in conjunction with the accompanying drawings, in which:

FIG. 11 is a flowchart of a voice recognition method, according to an embodiment.

The same reference numerals are used to represent the same elements throughout the drawings.

DETAILED DESCRIPTION

The disclosure may have several embodiments, and the embodiments may be variously modified. In the following description, embodiments are provided with accompanying drawings and detailed descriptions thereof. However, this does not necessarily limit the scope of the embodiments to a specific form. Instead, modifications, equivalents and replacements included in the disclosed concept and technical scope of this specification may be employed. While describing embodiments, specific description regarding known technologies may be omitted to avoid obscuring the disclosure.

In the disclosure, relational terms such as first and second, and the like, may be used to distinguish one entity from another entity, without necessarily implying any actual relationship or order between such entities. In embodiments of the disclosure, relational terms such as first and second, and the like, may be used to distinguish one entity from another entity, without necessarily implying any actual relationship or order between such entities.

The terms used herein are solely intended to explain a specific embodiment, and not to limit the scope of the disclosure. It is to be understood that the singular forms "a," "an," and "the" include plural referents unless the context clearly dictates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

Expressions such as "at least one of" when preceding a list of elements, modify the entire list of elements and do not modify the individual elements of the list. For example, the expression, "at least one of a, b, and c" and "at least one of a, b, and/or c" should be understood as including only a, only b, only c, both a and b, both a and c, both b and c, or all of a, b, and c.

In the embodiments disclosed herein, a term 'module' or 'unit' refers to an element that performs at least one function or operation. The 'module' or 'unit' may be realized as hardware, software, or combinations thereof. In addition, a plurality of 'modules' or a plurality of 'units' may be integrated into at least one module and may be realized as at least one processor except for 'modules' or 'units' that should be realized in a specific hardware.

Below, an embodiment will be described in detail with reference to the attached drawings.

Figure 1:
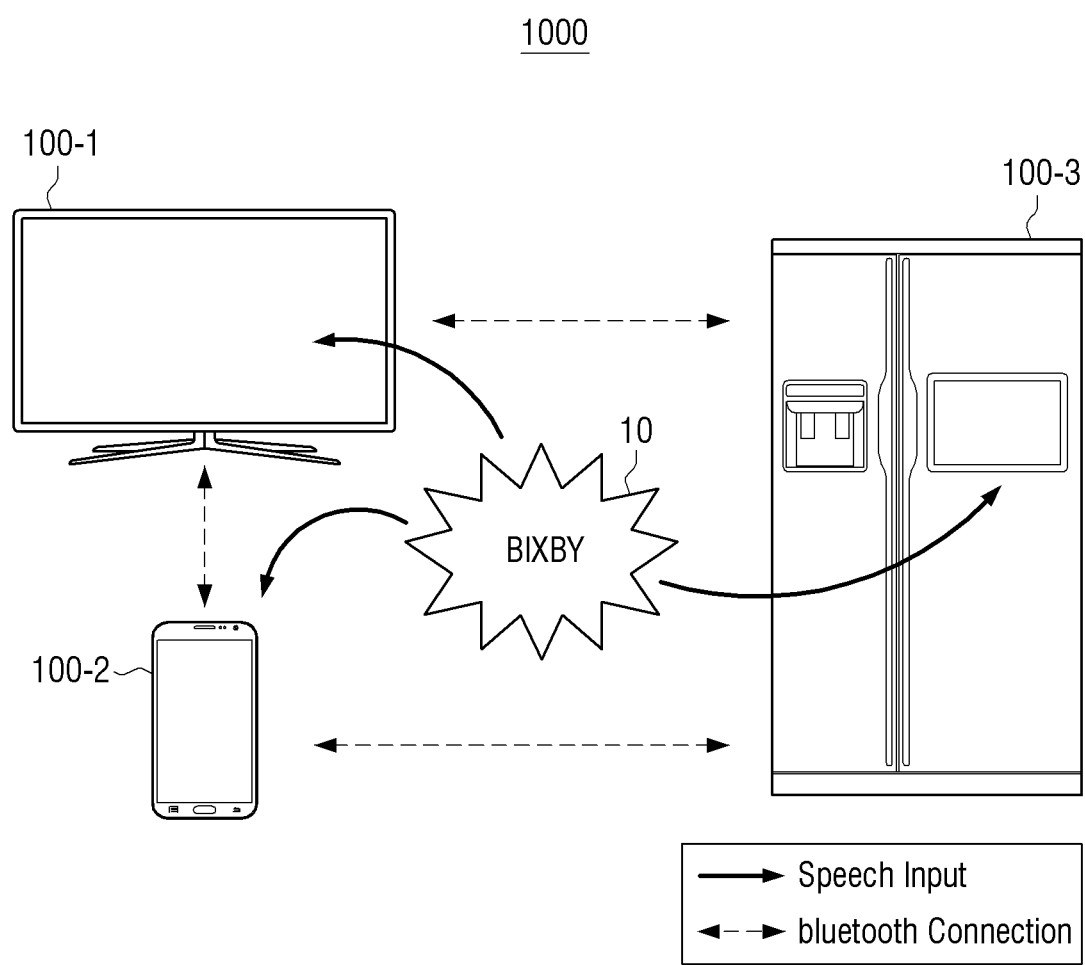
FIG. 1 is a diagram illustrating a configuration of a voice recognition system, according to an embodiment.

FIG. 1 is a diagram illustrating a configuration of a voice recognition system, according to an embodiment.

Referring to FIG. 1, the voice recognition system may include a plurality of electronic apparatuses 100-1, 100-2 and 100-3.

Each of the plurality of electronic apparatuses 100-1, 100-2 and 100-3 is an apparatus having voice recognition functionality and is capable of performing a function according to the voice recognition result. Here, voice recognition refers to a technique of transforming an acoustical signal of an input voice into a word or a sentence, and then the word or sentence may be evaluated to correspond to a command that causes the electronic apparatus to execute a function thereof.

The plurality of electronic apparatuses 100-1, 100-2 and 100-3 may have similar voice recognition functionalities and thus, an operation in a single electronic apparatus will be described below for brevity.

The electronic apparatus 100 may receive and/or detect input in the form of a user voice, and perform voice recognition on the input voice. In detail, the electronic apparatus 100 may be an apparatus performing voice recognition when a wake up word (WUW) is sensed. In this regard, the wake up word (WUW) is a trigger that activates a voice recognition function.

When a wake up word (WUW) is sensed, the electronic apparatus 100 may determine whether to perform voice recognition. In detail, the electronic apparatus 100 may detect whether a wake up word (WUW) is sensed in the instance that another electronic apparatus also detects or could detect the WUW, determine that an electronic apparatus (having the highest priority from among electronic apparatuses in which the wake up word (WUW) is sensed) performs voice recognition, and determine that an electronic apparatus having a lower priority does not perform voice recognition.

In addition, when a wake up word (WUW) is sensed, the electronic apparatus 100 performing the voice recognition may perform voice recognition on the input voice, and determine in which apparatus a command and/or a function according to a result of the voice recognition is to be performed.

The electronic apparatus 100 may identify in which electronic apparatus the function is to be performed, using apparatus information of the respective apparatuses, history information in the respective apparatuses, etc. The determination operation will be described in greater detail later with reference to FIG. 2.

In addition, the electronic apparatus 100 may control the identified target apparatus to perform a command or execute a function based on the voice recognition result. For example, when it is determined that a first electronic apparatus 100-1 performs a function according to voice recognition, second electronic apparatuses 100-2 and 100-3 may transmit a control command according to the voice recognition to the first electronic apparatus 100-1. In addition, the first electronic apparatus 100-1 may itself perform the function according to the voice recognition result based on the received control command and the voice recognition result recognized.

As described above, the voice recognition system 1000 according to an embodiment may determine an electronic apparatus to perform a function based on the recognized result, and perform the function only in a determined electronic apparatus corresponding thereto. Thereby, it is possible to perform an operation that corresponds to the user's actual intention.

Meanwhile, in FIG. 1, it is described that three electronic apparatuses are provided in a voice recognition system. However, the system may be implemented to include two electronic apparatuses or four or more electronic apparatuses.

In addition, in the illustrated example, the respective electronic apparatuses may be of different types. However, in an implementation, at least two apparatuses may be of a same type.

In FIG. 1, it is described that only an electronic apparatus of a higher priority from among electronic apparatuses sensing a wake up word (WUW), from among a plurality of electronic apparatuses, performs voice recognition. However, in an implementation, an electronic apparatus sensing a wake up word (WUW) performs voice recognition regardless of priorities, and shares the voice recognition result with others of the plurality of electronic apparatuses.

For example, the respective electronic apparatuses included in a voice recognition system may output different voice recognition results according to an utterance position of the user and a surrounding noise. Accordingly, to improve the voice recognition result, that is, for elevated voice recognition, it may be implemented such that all electronic apparatuses sensing a wake up word (WUW) perform voice recognition and share the voice recognition result thereof with each other.

The above-described operation will be described in greater detail below, through a detailed configuration of the above-described electronic apparatus.

Figure 2:
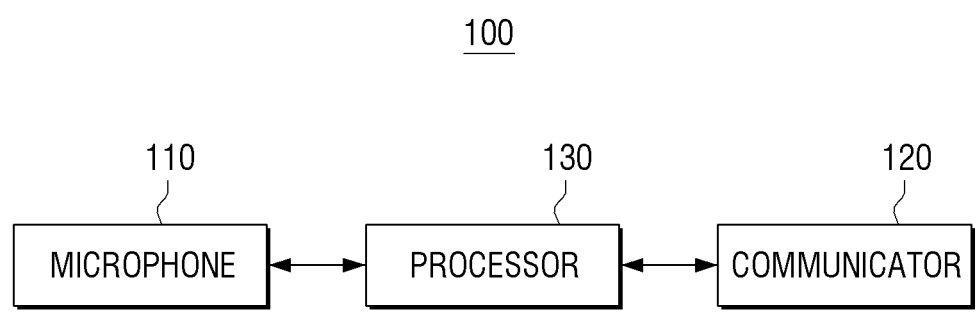
FIG. 2 is a block diagram of an electronic apparatus, according to an embodiment.

FIG. 2 is a block diagram of an electronic apparatus, according to an embodiment.

Referring to FIG. 2, the electronic apparatus 100 may include a microphone 110, a communicator 120, and a processor 130. The electronic apparatus 100 may be a PC, a TV, a mobile apparatus, a set-top box, a refrigerator, a washing machine, a microwave, a speaker, etc., and may be any electronic apparatus capable of executing a voice recognition function.

The microphone 110 may receive a voice input. In detail, the microphone 110 may receive a voice input and transform the voice input into a voice signal capable of being processed in the electronic apparatus 100. Meanwhile, in the illustrated example, the microphone 110 may be mounted in the electronic apparatus 100. However, in an implementation, the microphone may be an external apparatus of the electronic apparatus. It may be implemented such that a voice signal is received from an external microphone.

The communicator 120 is configured to communicate with various kinds of external apparatuses in various communication methods. In detail, the communicator 120 may communicate with another electronic apparatus, or may communicate via an external network (e.g., the Internet, server, etc.). For this operation, the communicator 120 may include a Wi-Fi chip and a Bluetooth chip.

For example, the communicator 120 may communicate with another electronic apparatus in the voice recognition system 1000, and may communicate with an apparatus external to the voice recognition system via a Wi-Fi chip. Meanwhile, in an implementation, it is possible to communicate with another electronic apparatus in the voice recognition system 100 via a Wi-Fi chip.

In a case in which the electronic apparatus 100 performs a process of voice recognition by using an external server 100, the communicator 120 may transmit a voice signal received from the microphone 110 to an external server, and receive a recognition result from the external server.

In addition, the communicator 120 may perform communication to share apparatus information of another electronic apparatus included in the voice recognition system and apparatus information of the electronic apparatus to which the communicator 120 belongs. The apparatus information may include information that can identify an apparatus, such as an apparatus name, an apparatus model name, an apparatus type and the like, but also information about an app installed in the apparatus, functional information such as functions capable of being performed in the apparatus, information about a history of performance in the apparatus (a function that a user performed at a particular time or app performance history information), and a result of voice recognition performed in a particular app (voice recognition performed only in the corresponding apparatus through input of a particular functional button).

In addition, when a wake up word (WUW) is sensed, the communicator 120 may notify whether a wake up word (WUW) is sensed to the other electronic apparatuses. In addition, the communicator 120 may share the recognized voice recognition detail with the other apparatuses.

In addition, the communicator 120 may transmit a control command corresponding to the voice recognition result to the identified target apparatus. In addition, the communicator 120 may receive a control command according to the voice recognition result from the other electronic apparatus.

Meanwhile, the communicator 120 may be in a deactivated state or in a standby mode in which only the microphone 110 and the processor 130 are activated, and may be activated under the control of the processor when a voice input is received via the microphone 110. Thereafter, when it is determined that the electronic apparatus 100 does not perform voice recognition for the input voice, the communicator 120 may be deactivated again under the control of the processor 130.

In addition, the communicator 120 may receive, from an external apparatus, an image signal, an audio signal and information about the input voice through a wired method such as an antenna, a cable or a port, or may receive an image signal, an audio signal and information about other voice inputs through a wireless method such as Wi-Fi and Bluetooth.

In addition, although not illustrated in FIG. 2, according to example embodiments, the communicator 120 may further include a USB port to which a USB connector is connected, various external input ports for connecting various external terminals such as a headset, mouse, and LAN, and a DMB chip that receives and processes a DMB (Digital Multimedia Broadcasting) signal.

The processor 130 controls an overall operation within the electronic apparatus 100. In detail, the electronic apparatus 100 may sense another electronic apparatus capable of communicating with the electronic apparatus 100. To this end, the processor 130 may control the communicator 120 to sense another connectable electronic apparatus.

In addition, the processor 130 may store, in the memory 165, information about the another connectable apparatus. In addition, the processor 130 may update its own apparatus information stored at a predetermined time point and information of the another electronic apparatus.

In this regard, the predetermined time point may be a time point at which a new connectable apparatus is found, and may be a time point at which a new function or application is changed in the respective apparatuses. That is, in a case in which three electronic apparatuses are located in a voice recognition system and then, a new apparatus is added, the respective apparatuses may share the apparatus information described above or update shared data.

In an implementation, it is possible to update a time point at which a particular event occurred or apparatus information pre-stored at periodical time zones.

In addition, when a wake up word (WUW) is input, the processor 130 may activate a voice recognition function. In detail, in a case in which an operation mode of the electronic apparatus 100 is a sleep mode, the processor 130 may convert the operation mode of the electronic apparatus 100 to a normal mode or other sleep modes (in more detail, a sleep mode in which communication with another electronic apparatus is possible).

When a wake up word (WUW) is input, the processor 130 may determine whether to perform voice recognition. In detail, the processor 130 may determine that a voice recognition is not performed, if the electronic apparatus 100 has a lower priority from among the apparatuses in which a wake up word (WUW) is sensed, and that a voice recognition is performed, if the electronic apparatus 100 has the highest priority. To this end, when a wake up word (WUW) is sensed, the communicator 130 may share whether a wake up word (WUW) is sensed with another electronic apparatus.

In addition, the processor 130 may perform voice recognition corresponding to the voice input received through the microphone. The processor 130 may perform voice recognition using its own voice recognition module, or may perform voice recognition by transmitting a voice signal received to an external server and receiving a recognition result from the server.

In addition, the processor 130 may, based on a result of the performed voice recognition, identify a target apparatus to perform a function according to the voice recognition result. In detail, the processor 130 may acquire a keyword (or a word, etc.) by analyzing the result of the performed voice recognition, and search for a keyword necessary to specify a particular apparatus or function.

In addition, the processor 130 may, based on the found keyword, determine an apparatus corresponding to the found keyword or an electronic apparatus capable of performing a function related to the keyword from among a plurality of electronic apparatuses included in the voice recognition system 1000.

For example, the keyword may include a keyword identifying a particular apparatus (e.g., an apparatus name, an apparatus type, an apparatus model name), and the processor 130 may identify a target apparatus based on the corresponding keyword.

If a keyword capable of identifying a particular apparatus is not included, the processor 130 may identify a target apparatus based on a keyword identifying a function.

If the acquired keyword includes both a keyword capable of identifying a particular apparatus and a keyword capable of identifying a particular function, the processor 130 may preferentially identify a target apparatus corresponding to the particular apparatus as a candidate apparatus, and verify whether the determined candidate apparatus is capable of performing the particular function.

Upon verification, if the candidate apparatus is capable of performing the particular function, the processor 130 may identify the corresponding candidate apparatus as a target apparatus.

In contrast, if the candidate apparatus is incapable of performing the particular function, the processor 130 may identify another apparatus capable of performing the particular function as a target apparatus.

In a case in which a plurality of target apparatuses are found in the process described above, for example, in a case that a user utters "Turn on XX channel on TV" but a plurality of TVs are included in a voice recognition system, the processor 130 may control one of the plurality of target apparatuses to perform a voice recognition result based on a current operation state. For example, in a case in which only one of the plurality of TVs are currently outputting an image, the processor 130 may identify that a TV currently operating is a target apparatus.

In addition, the processor 130 may control one of the plurality of target apparatuses to perform voice recognition and a function corresponding thereto based on user history information. In this case, if all of the plurality of TVs have history of reproducing a particular broadcast, the processor 130 may determine that an apparatus more frequently used by the user at a current time zone is a target apparatus, or make a determination based on a result of voice recognition to be individually performed in a particular apparatus.

In addition, it is possible to identify one target apparatus from among a plurality of target apparatuses based on a predetermined priority (ranking automatically set by an apparatus) or a priority set by the user.

If neither a keyword capable of identifying a particular apparatus nor a keyword capable of identifying a particular function is acquired, the processor 130 may identify that an apparatus having a predetermined higher priority is a target apparatus.

In addition, the processor 130 may transmit a control command corresponding to the voice recognition result to the determined target apparatus. In detail, in a case in which the identified target apparatus is another electronic apparatus, the processor 130 may control the communicator 120 to transmit the control command corresponding to the voice recognition result to the other electronic apparatus.

In a case in which the electronic apparatus 100 is a sleep mode before voice is recognized, the processor 130 may control an operation of the electronic apparatus converted back to the sleep mode.

In a case in which the identified target apparatus is the electronic apparatus 100 itself, the processor 130 may perform a function according to the voice recognition result.

In addition, the processor 130 may determine the operation mode of the electronic apparatus 100. Specifically, when a TV display command or a content display command is received, the processor 130 may determine an operation mode that displays a normal image. In this regard, the operation mode is an operation state displaying a normal image.

The electronic apparatus 100 may further include features illustrated in FIG. 2. A detailed description of a configuration of the electronic apparatus 100 is provided below with reference to FIG. 2.

In the example described above, the electronic apparatus 100 senses a wake up word (WUW), and performs a voice recognition function only when a priority of the electronic apparatus 100 is high. However, in an implementation, it is possible to perform the voice recognition function regardless of priority. In addition, the processor 130 may share the voice recognition result with another electronic apparatus, and an electronic apparatus having a higher priority may perform a function of transmitting a control command based on the shared voice recognition result.

Figure 3:
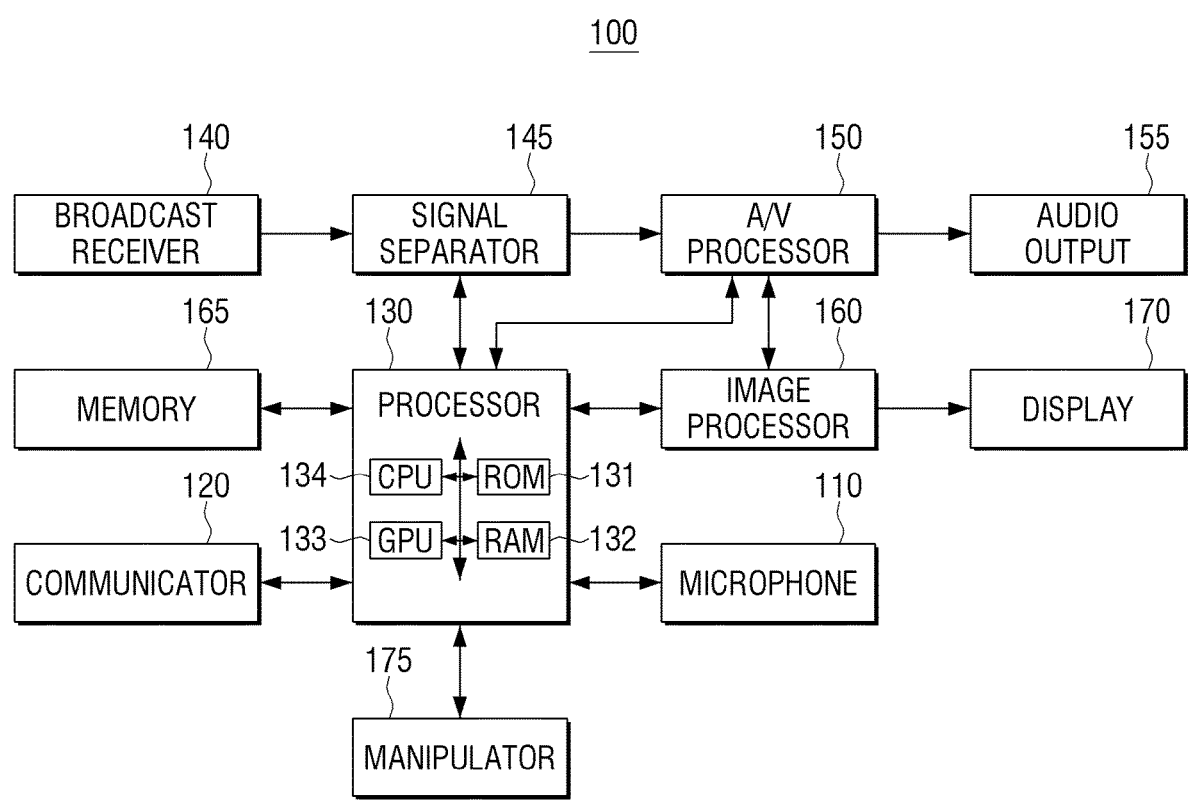
FIG. 3 is a detailed block diagram of an electronic apparatus, according to an embodiment.

FIG. 3 is a detailed block diagram of an electronic apparatus, according to an embodiment.

Referring to FIG. 3, the electronic apparatus 100 according to an embodiment may include a microphone 110, a communicator 120, a processor 130, a broadcast receiver 140, a signal separator 145, an audio/video (A/V) processor 150, an audio output 155, an image processor 160, a memory 165, a display 170, and a manipulator 175.

The microphone 110 and the communicator 120 are the same as the constitution illustrated in FIG. 2, which will not be redundantly explained below for the purpose of brevity.

The broadcast receiver 140 receives a broadcasting signal in a wired or wireless manner from a broadcasting station or a satellite and demodulates the received broadcasting signal. Specifically, the broadcast receiver 140 may receive a transmission stream via an antenna or a cable, demodulate the signal, and output a digital transmission stream signal.

The signal separator 145 divides a transmission stream signal provided from the broadcast receiver 140 into an image signal, an audio signal, and additional information signal. Further, the signal separator 145 transmits the image signal and the audio signal to the A/V processor 150.

Meanwhile, the broadcast receiver 140 and the signal separator 145 are configurations when the electronic apparatus 100 is implemented as a TV and thus, when the electronic apparatus 100 is configured as a monitor, the broadcast receiver 140 and the signal separator 145 may be omitted.

The A/V processor 150 performs signal processing, such as video decoding, video scaling, and audio decoding, with respect to the video signal and the audio signal that are input from the broadcast receiver 140 and/or the memory 165. In the embodiment described above, video decoding and video scaling are performed by the A/V processor 150. In embodiments, the operation described above may be performed by the image processor 160. In addition, the A/V processor 150 outputs the image signal to the image processor 160 and outputs the audio signal to the audio output 155.

In the case of storing the received video and audio signals in the memory 165, the A/V processor 150 may compress the video and audio signals and store the compressed video and audio signals in the memory 165.

The audio output 155 converts the audio signal that is output from the A/V processor 150 into sound, and outputs the sound through a speaker or to an external device connected thereto through an external output terminal.

The image processor 160 may generate a graphical user interface (GUI) for the user. Such a GUI may be an on screen display (OSD), and the image processor 160 may be realized as a digital signal processor (DSP).

In detail, when a voice recognition is performed and a target apparatus as the electronic apparatus 100 is identified as a result of voice recognition, the image processor 160 may display information about the voice recognition result on a GUI.

Further, the image processor 160 may add the generated GUI to an image that is output from the A/V processor 150, which will be described later. In addition, the image processor 160 may provide an image signal corresponding to an image to which the GUI is added to the display 170.

Accordingly, the display 170 displays various information (e.g., information about a voice recognition result) provided from the electronic apparatus 100 and an image transmitted from the image signal provider 160.

The memory 165 may store image content. For example, the memory 165 may receive and store image content, in which video and audio are compressed, from the A/V processor 150, and may be controlled by the processor 130 to output the stored image content to the A/V processor 150.

The memory 165 may store apparatus information of an electronic apparatus. In addition, the memory 165 may store apparatus information of another apparatus. In addition, the apparatus information of the electronic apparatus and the apparatus information about the another apparatus may be updated at a predetermined time point. Meanwhile, the memory 165 may be implemented as a non-volatile memory (e.g., hard disk, solid state drive (SSD) and flash memory), a volatile memory and the like.

The display 170 may display an image. Such display 170 may be implemented as various types of displays, such as a Liquid Crystal Display (LCD), an Organic Light Emitting Diodes (OLED) display, a Quantum dot light-emitting diodes (QLED), and the like. In a case in which the display 170 is configured as an LCD, the display 120 may include a driving circuit, a backlight unit, and the like which may be implemented in forms such as an a-si TFT, a low temperature poly silicon (LTPS) TFT, an organic TFT (OTFT), and the like. Meanwhile, the display 170 may be realized as a touch screen and combined with a touch sensor.

In a case in which the display 170 is configured as an LCD, the display 120 includes a backlight. In this regard, the backlight is a point light source that includes a plurality of light sources, which may support local dimming.

In this case, the light source included in the backlight may be configured with a cold cathode flourescent lamp (CCFL) or a light emitting diode (LED). Hereinafter, it will be illustrated and described that the backlight is configured with an LED and an LED driving circuit. However, at the time of implementation, the backlight may be realized as a feature other than the LED. The plurality of light sources of the backlight may be arranged in various forms, and diverse local dimming methods may be applied. For example, the backlight may be a direct type backlight in which a plurality of lights are disposed in a matrix form and uniformly arranged on the entire LED screen. In this regard, the backlight may be operated with full-array local dimming or direct local dimming. In this regard, the full-array local dimming is a dimming method which adjusts the brightness of each light source as a whole, evenly spreading the entire light source behind the LCD screen. In addition, the direct local dimming is similar to the full-array local dimming method, but it is a dimming method that adjusts the brightness of each light source with a less number of light sources.

In addition, the backlight may be a direct type backlight which disposes a plurality of light sources in the entire area or an edge type backlight in which a plurality of light sources are disposed only on the edges of the LCD. In this regard, the backlight may be operated with edge-lit local dimming. In the edge-lit local dimming, a plurality of light sources are disposed on the edge of the panel, and can be disposed only on the left/right side, only on the upper/lower side, or on the left/right/upper/lower sides.

The manipulator 175 may be realized as a touch screen, a touch pad, a key button, a key pad, and the like, to provide a user manipulation of the electronic apparatus 100. According to an embodiment, a control command is received through the manipulator 175 of the electronic apparatus 100, but the manipulator 175 may receive a user manipulation from an external control apparatus (for example, a remote controller).

The processor 130 may control an overall operation of the electronic apparatus 100. Specifically, the processor 130 may control the image processor 160 and the display 170 so that an image according to a control command received through the manipulator 175 is displayed in an operating mode.

The controller 130 may include read-only memory (ROM), random access memory (RAM), a graphic processing unit (GPU), a central processing unit (CPU), and a bus. The ROM 131, the RAM 132, the GPU 133 and the CPU 134 may be connected with each other through the bus.

The CPU 134 may access the memory 165 and perform booting using the 0/S stored in the memory 165. The CPU 134 may also perform various operations by using various types of programs, contents, data, and the like stored in the memory 165. The operations of the CPU 134 have been described above in connection with the processor 130 in FIG. 2.

The ROM 131 may store a set of instructions for system booting. If a power-on command is input and the power is supplied, the CPU 134 copies the 0/S stored in the memory 165 into the RAM 132 according to the command stored in the ROM 131, and boots the system by executing the 0/S. When the booting is completed, the CPU 134 may copy the various programs stored in the memory 165 to the RAM 132, and perform various operations by implementing the programs copied to the RAM 132.

Upon completion of the boot-up operation, the GPU 133 may generate a screen including various objects, such as icons, images, text, or the like. The configuration of GPU described above may be configured as an separate feature such as the image processor 160, and may be realized as, for example, a System on Chip (SoC) that is combined with the CPU within the processor 130.

In FIG. 3, the processor 130 includes only one processor. However, in an implementation, the processor 130 may include a plurality of processors, and one of the processors may be exclusive for voice recognition. The example described above will be described below with reference to FIG. 4.

As described above, the electronic apparatus 100 according to an embodiment may determine an apparatus to perform a voice recognition result based on the recognized result, and perform the function only in the corresponding apparatus. Thereby, it is possible to perform an operation that corresponds to a user's intention. In addition, the electronic apparatus 100 according to an embodiment may perform a function by using a recognition result of another apparatus and thus, a range of voice recognition may be expanded.

In the example described above, the display 150 is an essential feature. However, in a case that the electronic apparatus 100 performs only signal processing, such as a set-top box, the display 150 may be omitted and the processor may transmit information about a UI screen to an external display apparatus so that the UI screen is displayed on the external display apparatus.

In addition, in a case in which the electronic apparatus 100 is a washing machine, a refrigerator, etc., additional features for performing a particular function in the corresponding apparatus may be further included.

In FIGS. 1-3, each of the plurality of electronic apparatuses pre-stores apparatus information and uses the pre-stored apparatus information. However, in an implementation, a plurality of electronic apparatuses may request apparatus information at a time point when voice recognition is necessary, and use the apparatus information. In addition, only one (e.g., an unmovable apparatus such as TV, refrigerator and the like) of a plurality of electronic apparatuses may manage apparatus information (including history information) of the plurality of electronic apparatuses.

Figure 4:
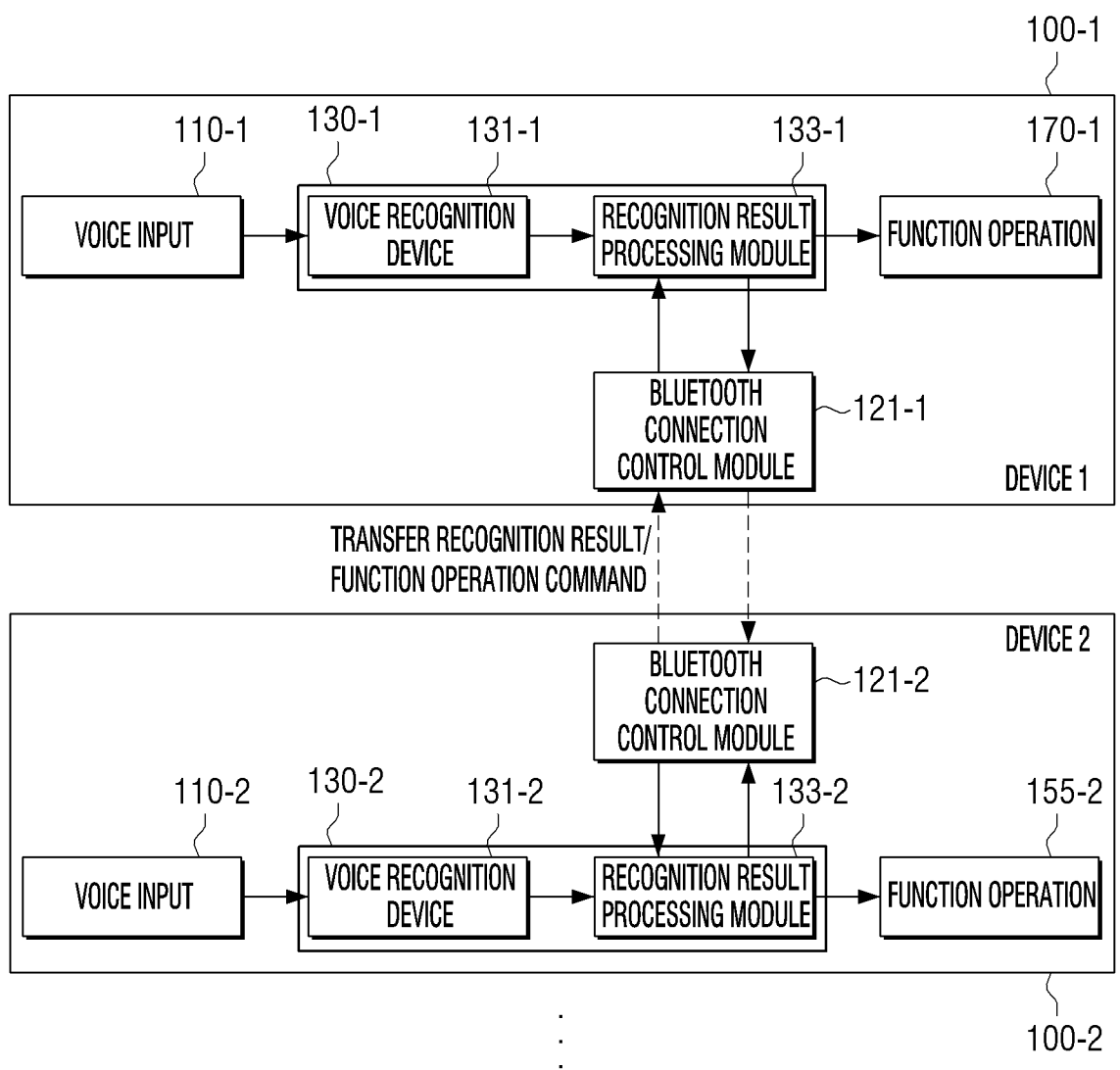
FIG. 4 is a diagram illustrating an interlocking operation of voice recognition operation between a plurality of electronic apparatuses.

FIG. 4 is a diagram illustrating an interlocking operation of voice recognition operation between a plurality of electronic apparatuses.

Referring to FIG. 4, the voice recognition system 1000 may include a first electronic apparatus 100-1 and a second electronic apparatus 100-2.

Hereinafter, common features to the two electronic apparatuses will be described and then, an interlocking operation of the two electronic apparatuses will be described.

The electronic apparatuses 100-1 and 100-2 may include a voice input 110 (110-1, 110-2), a communicator 120 (121-1, 121-2), a processor 130 (130-1, 130-2), and a function part 155-2, 170-1.

The voice input 110 may receive input of a user utterance. For example, the voice input 110 may receive input of a user uttered voice using a microphone or receive a voice signal from an external microphone.

The processor 130 may perform voice recognition for the input voice signal. For example, the processor 130 may include a voice recognition processor 131 (131-1, 131-2) and a voice recognition result processor 133 (133-1, 133-2).

The voice recognition processor 131 may sense a wake up word (WUW).

In addition, the voice recognition processor 131 may perform voice recognition for a voice signal input after input of the wake up word (WUW). For example, the voice recognition processor 130 may analyze a waveform of the voice signal and generate a text sentence (speech-to-text) corresponding to the user uttered voice. In an implementation, the voice recognition processor 131 may generate a text sentence using a voice recognition algorithm stored therein, or may be implemented to provide the voice signal to a network-based (cloud) server, receive the result, and use the received result.

When a wake up word (WUW) is sensed in the voice recognition processor 131, the voice recognition result processor 133 may determine whether a voice recognition operation is to be performed. To this end, the voice recognition result processor 133 may control the communicator 120 to notify another electronic apparatus of the fact that a wake up word (WUW) is sensed, and in a case of an apparatus having the highest priority from among electronic apparatuses sensing the wake up word (WUW), determine that voice recognition is to be performed.

Meanwhile, an utterance command of a user may be consecutively input after the utterance of the wake up word (WUW). Accordingly, the voice recognition processor 131 may proceed with the voice recognition result independently of the determination operation described above. The voice recognition result processor 133 may, when it is determined that the corresponding electronic apparatus 100-1 performs voice recognition, control to continue the above-mentioned process, and when it is determined that the other electronic apparatus 100-2 performs voice recognition, control to suspend the voice recognition process operation described above.

The voice recognition result processor 133 may identify a target apparatus based on a text message generated in the voice recognition processor 131. For example, the voice recognition result processor 133 may acquire a keyword from the generated text message, search for a keyword which is capable of being used to identify an apparatus and a function in the acquired keyword, and identify a target apparatus by using the found keyword and pre-stored apparatus information. The operation described above is described in the processor 130 of FIG. 2, which will not be redundantly explained below for the purpose of brevity.

When a target apparatus is identified, the processor 130 may control the communicator 120 or the function part 170 such that the corresponding operation is performed in the target apparatus.

The communicator 120 may share apparatus information of an electronic apparatus, and share the generated control command. The communicator 120 may be implemented as a Bluetooth module.

The function part 170 and 150 may perform a function corresponding to the generated control command or the received control command. For example, if the control command is a function of displaying a particular content, the function part 170 may perform an operation of displaying the particular content. If the control command is a sound output of a particular content, the function part 150 may perform an operation of outputting audio corresponding to the particular content.

An interlocking operation of the two electronic apparatuses 100-1 and 100-2 in a case that a wake up word (WUW) is sensed will be described below.

For example, when a user utters a wake up word (WUW), the two electronic apparatuses 100-1 and 100-2 may activate a voice recognition function. If only one apparatus 100-1 from among the two electronic apparatuses senses the wake up word (WUW), the first electronic apparatus 100-1 may perform voice recognition for a user's voice, and perform both operations of identifying and controlling a target apparatus.

In a case in which the user utters a wake up word (WUW) and both electronic apparatuses 100-1 and 100-2 sense the wake up word (WUW), the voice recognition may be performed only in one electronic apparatus 100-2 according to a predetermined priority.

In the example described above, whether a wake up word (WUW) has been sensed is shared between the apparatuses, and accordingly, voice recognition is performed only in one electronic apparatus. However, the sharing may be done at a different time point.

For example, the electronic apparatus 100-1 and 100-2 may individually perform voice recognition when a wake up word (WUW) is sensed. The two electronic apparatuses 100-1 and 100-2 may share a text as a result of voice recognition, or may share only a control command which is a final result in accordance with the shared text. In an implementation, it is possible to share only the control command which is the final result, and if control commands generated in the two electronic apparatuses 100-1 and 100-2 are different from each other, to share the voice recognition result and modify one of the control commands that are different from each other.

Meanwhile, the two electronic apparatuses 100-1 and 100-2 may share apparatus information to identify a target apparatus to perform the recognition result. The apparatus information may be shared in advance. Such an operation will be described later with reference to FIG. 5.

Figure 5:
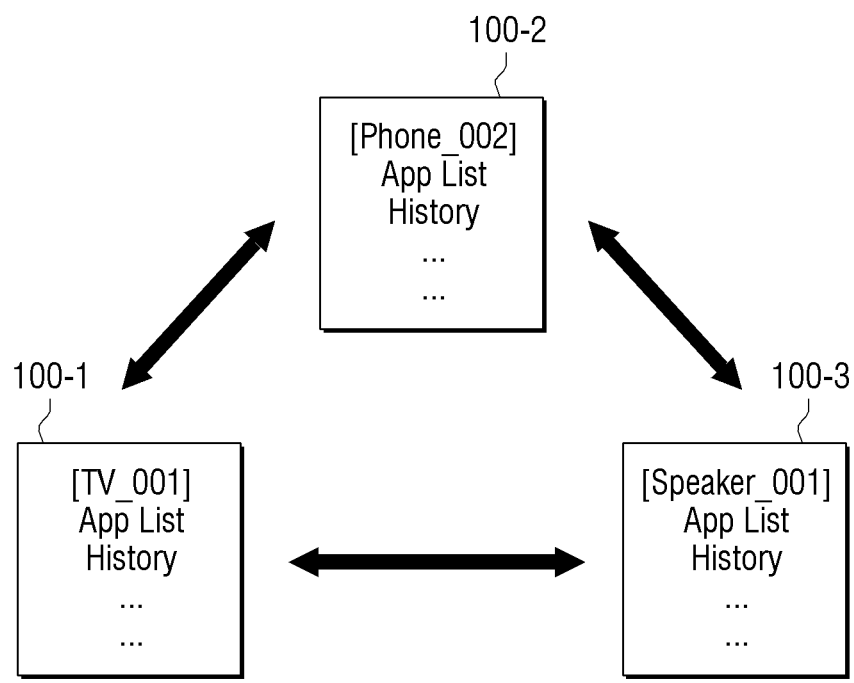
FIG. 5 is a diagram provided to explain an initial setting operation between a plurality of electronic apparatuses.

FIG. 5 is a diagram provided to explain an initial setting operation between a plurality of electronic apparatuses.

Referring to FIG. 5, the voice recognition system 1000 may include a first electronic apparatus 100-1, a second electronic apparatus 100-2, and a third electronic apparatus 100-3. The apparatuses 100-1, 100-2, 100-3 have been discussed above.

When the voice recognition system 1000 is initially set, or when a new apparatus is added to the voice recognition system 1000 or at a predetermined time point, the respective apparatuses in the voice recognition system 1000 may share their own apparatus information with one another.

For example, in a case in which the first electronic apparatus 100 pre-stores information necessary to identify itself, information about installed apps, history information, etc., when sharing is necessary, the first electronic apparatus 100 may transmit the corresponding information about itself to the other electronic apparatuses 100-2 and 100-3.

In contrast, the first electronic apparatus 100-1 may receive apparatus information about another electronic apparatus and store the received information.

The same operation may be performed on the second electronic apparatus 100-2 and the third electronic apparatus 100-3.

In addition, a priority according to which voice recognition between the above-described plurality of electronic apparatuses may be determined in advance. The priority may be determined according to a time sequence included in the voice recognition system described above, or may be determined based on a rate of success of voice recognition of the respective electronic apparatuses. In addition, the user may directly set priority.

Meanwhile, a private house may include many rooms and different electronic apparatuses may be provided in each of the rooms. In a case that ten units of electronic apparatus capable of voice recognition are distributed in multiple rooms in a private house, if all ten electronic apparatuses share apparatus information with one another, it will put a strain on a storage space of the respective electronic apparatuses.

In this case, the plurality of electronic apparatuses may be divided into a plurality of groups and that apparatus information is shared by groups. For example, it is possible to share apparatus information only between electronic apparatuses provided in the living room and to share apparatus information only between electronic apparatuses provided in the main room.

Alternatively, any one electronic apparatus from among the ten units of electronic apparatus may function as a server and thus, apparatus information of all apparatuses may be stored in only one apparatus and information may be provided from the apparatus serving as the server to the other electronic apparatuses as needed. In this case, the electronic apparatus acting as the server may include location information of the respective apparatuses, and provide only information about an apparatus disposed at the same location. For example, when an electronic apparatus located in the living room requests apparatus information of another apparatus, only apparatus information of another electronic apparatus located in the living room may be provided to the apparatus which made a request for apparatus information.

Figure 6:
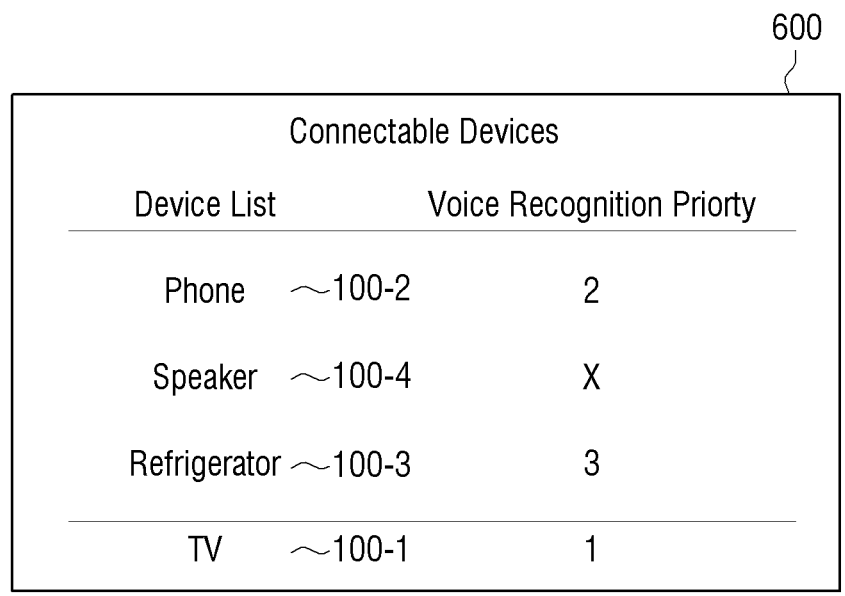
FIG. 6 is a diagram illustrating an example of a predetermined priority of each of a plurality of electronic apparatuses.

FIG. 6 is a diagram illustrating an example of a predetermined priority of each of a plurality of electronic apparatuses.

Referring to FIG. 6, information about a plurality of electronic apparatuses included in a voice recognition system and a priority of the respective electronic apparatuses is illustrated.

Such a priority may be preset by a user based on apparatus use history of the user or history information of an apparatus frequently used for voice recognition. In addition, voice recognition is mainly performed in an apparatus having a higher priority and thus, a priority may be determined based on a performance index associated with voice recognition such as a success rate of voice recognition or the like.

The priority may be used in a case in which it is difficult to specify a particular apparatus based on a content of a user utterance or a plurality of apparatuses supporting the same function are present.

In detail, the user may connect apparatuses having the same wake up word (WUW) to Bluetooth, and designate a priority of voice recognition.

A target apparatus to process a voice command of the user is selected based on the designated priority, and when it is not possible to specify a target to perform a voice recognition result, the priority may be used as a reference of command execution.

For example, in a case in which a TV and smartphone having a wake up word (WUW) of "Bixby" and the user utters "Bixby, turn on news on TV," even if the wake up word (WUW) is recognized in the TV and the smartphone at the same time, if a smartphone has a higher voice recognition priority by the user, it is possible to primarily process a voice command of the user in the smartphone and transfer the command to be operated on the TV. The operation described above will be described below with reference to FIG. 7.

In addition, in a case in which it is difficult to estimate a particular apparatus as in a case that "Bixby, play music" is uttered, voice recognition may be executed in accordance with the set priority. The operation described above will be described below with reference to FIG. 8.

Figure 7:
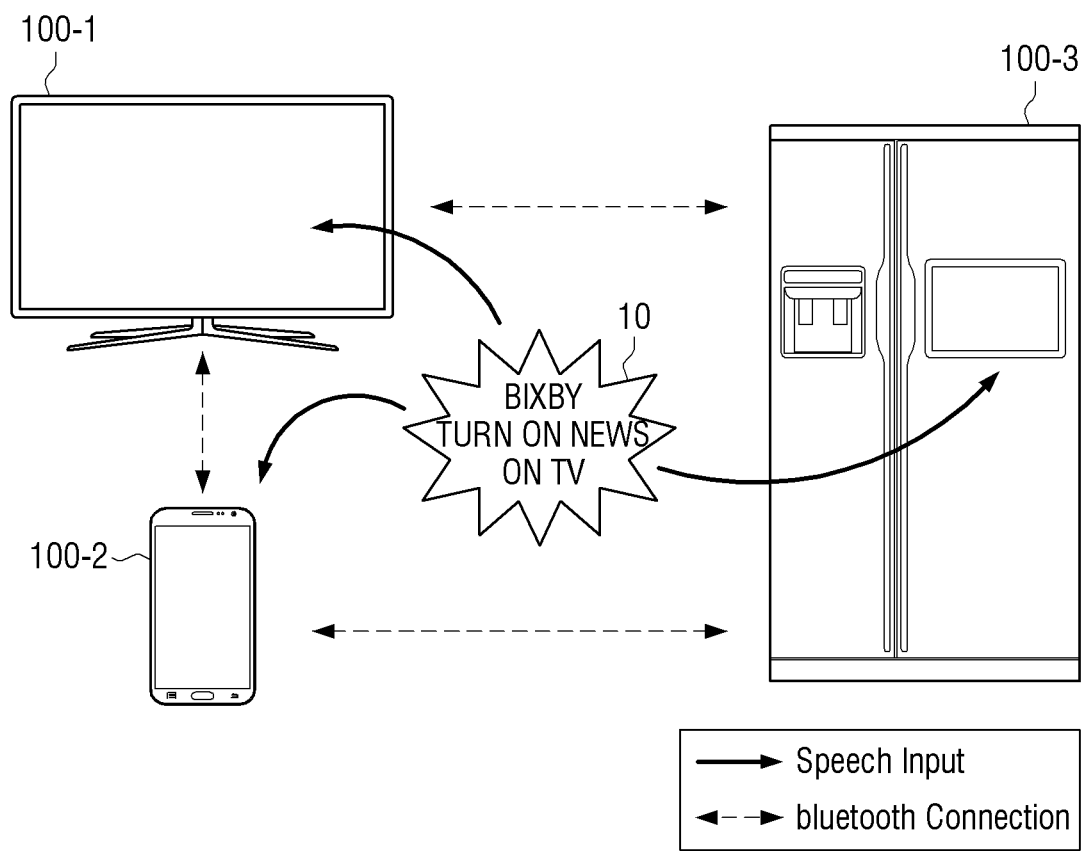
FIG. 7 is a diagram provided to explain an operation of selecting an apparatus to perform a voice recognition result from among a plurality of electronic apparatuses by using information to be controlled in a sentence.

FIG. 7 is a diagram provided to explain an operation of selecting an apparatus to perform a voice recognition result from among a plurality of electronic apparatuses by using information to be controlled in a sentence.

The priority described above may be used to determine an apparatus to perform voice recognition, and may be used to determine an apparatus to perform a function according to the final voice recognition. First, an operation in a case of determining an apparatus to perform voice recognition will be described below.

Referring to FIG. 7, when a user utterance is received, each of a plurality of electronic apparatuses 100-1, 100-2 and 100-3 in the voice recognition system 1000 may analyze the user utterance and sense whether the input utterance is a wake up word (WUW).

When the user utterance is a wake up word (WUW), the respective apparatuses 100-1, 100-2 and 100-3 may share information indicating that the wake up word (WUW) has been successfully recognized.

In this case, the respective electronic apparatuses 100-1, 100-2 and 100-3 may identify whether connected apparatuses have been recognized and a priority of voice recognition, and thus may determine in which electronic apparatus analysis of the voice instruction is to be performed.

For example, in a case the first electronic apparatus 100-1 has a higher priority and a wake up word (WUW) is sensed, voice recognition may be performed for a voice uttered by the user, and the first electronic apparatus 100-1 may be identified as a target apparatus by using a keyword "TV" which is capable of identifying a particular apparatus in a result of the performed voice recognition.

Meanwhile, an apparatus performing voice recognition is a target apparatus and thus, the first electronic apparatus 100-1 may immediately perform an operation for the voice recognition result.

If the first electronic apparatus 100-1 has the highest priority but a wake up word (WUW) is not sensed, the second electronic apparatus 100-2 of the next ranking may perform voice recognition for the voice uttered by the user. The second electronic apparatus 100-2 may identify the first electronic apparatus 100-1 as a target apparatus by using a keyword "TV" capable of identifying a particular apparatus in the result of the performed voice recognition.

In this case, the second electronic apparatus 100-2 may generate a control command associated with news reproduction in the first electronic apparatus 100-1, and transmit the generated control command to the first electronic apparatus 100-1. The generated control command may be a command recognizable in only a particular apparatus, which may be, for example, change channel to 11, and turn on TV and change channel to 11, and may be, as a result, "Turn on news."

In the example described above, voice recognition is performed only in a particular apparatus according to a priority. However, in an implementation, all apparatuses sensing a wake up word (WUW) may perform voice recognition.

In other words, all apparatuses successfully recognizing a wake up word (WUW) may perform voice recognition, and that the voice recognition result (e.g., Turn on news on TV.) is shared.

In addition, the priority described above may be not only used to determine an apparatus to perform a voice recognition function but also may be, if it is possible that a function according to a user voice is performed in a plurality of apparatuses, used to specify any apparatus. This will be described below with reference to FIG. 8.

Figure 8:
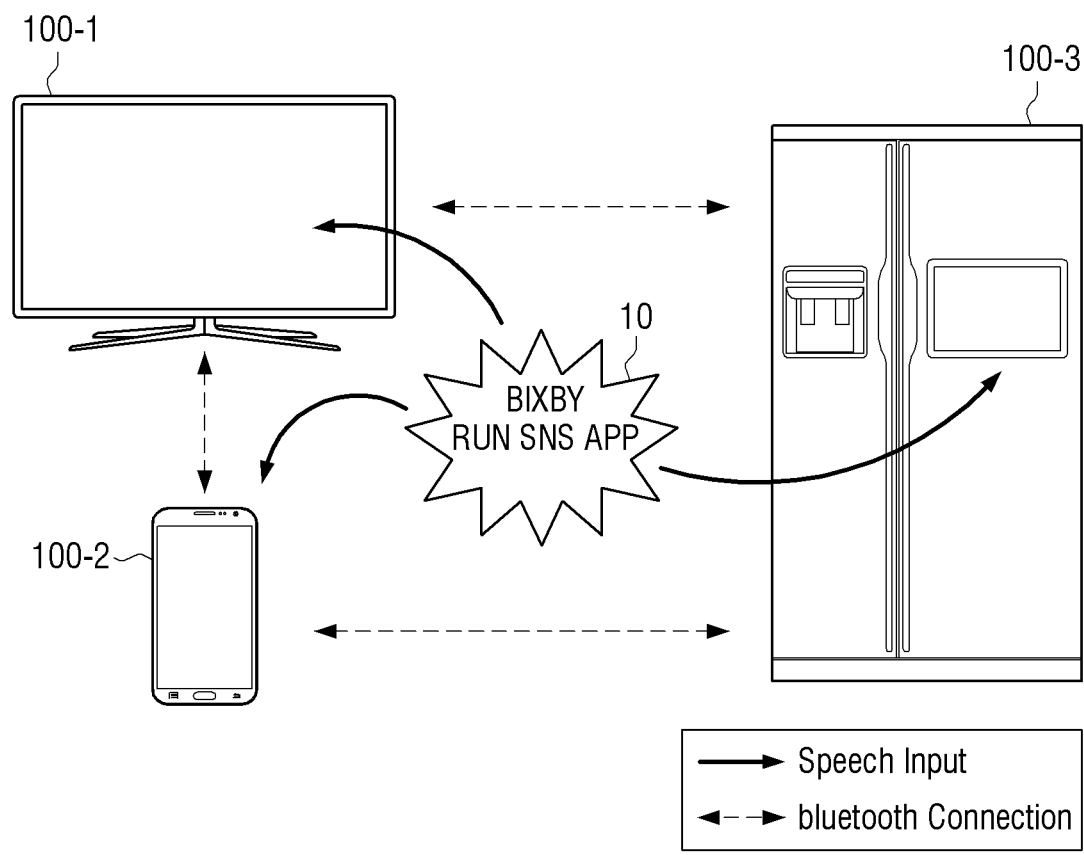
FIG. 8 is a diagram provided to explain an operation of selecting an apparatus to perform a voice recognition result from among a plurality of electronic apparatuses by using apparatus information.

FIG. 8 is a diagram provided to explain an operation of selecting an apparatus to perform a voice recognition result from among a plurality of electronic apparatuses by using apparatus information.

Referring to FIG. 8, when a user utterance is received, each of a plurality of electronic apparatuses 100-1, 100-2 and 100-3 in the voice recognition system 1000 may analyze the user utterance and sense whether the input utterance is a wake up word (WUW).

When it is determined that the user utterance is a wake up word (WUW), the respective apparatuses 100-1, 100-2 and 100-3 may share the fact that the wake up word (WUW) has been sensed.

As a result of sharing, an electronic apparatus having a higher priority may perform a voice recognition function. For example, if the first electronic apparatus 100-1 has the highest priority, the first electronic apparatus 100-1 may perform voice recognition, and identify a target apparatus according to the recognition result.

For example, in a case an uttered voice of the user includes a keyword related to performing a function called an SNS app, the SNS app is capable of being run in the first electronic apparatus 100-1 and the second electronic apparatus 100-2, and the first electronic apparatus 100-1 has a higher priority, the first electronic apparatus 100-1 may determine that the first electronic apparatus 100-1 preferentially executes the SNS app.

Since it is determined that the first electronic apparatus 100-1 performs the operation, the first electronic apparatus 100-1 may perform an operation according to the recognition result.

In the example described above, when a particular function is capable of being performed in a plurality of electronic apparatuses, a target apparatus is identified based on a predetermined priority. However, in an implementation, it is possible to identify a target apparatus based on history information of the user before taking a priority into account, and consider a priority only when it is difficult to specify a target apparatus.

Figure 9:
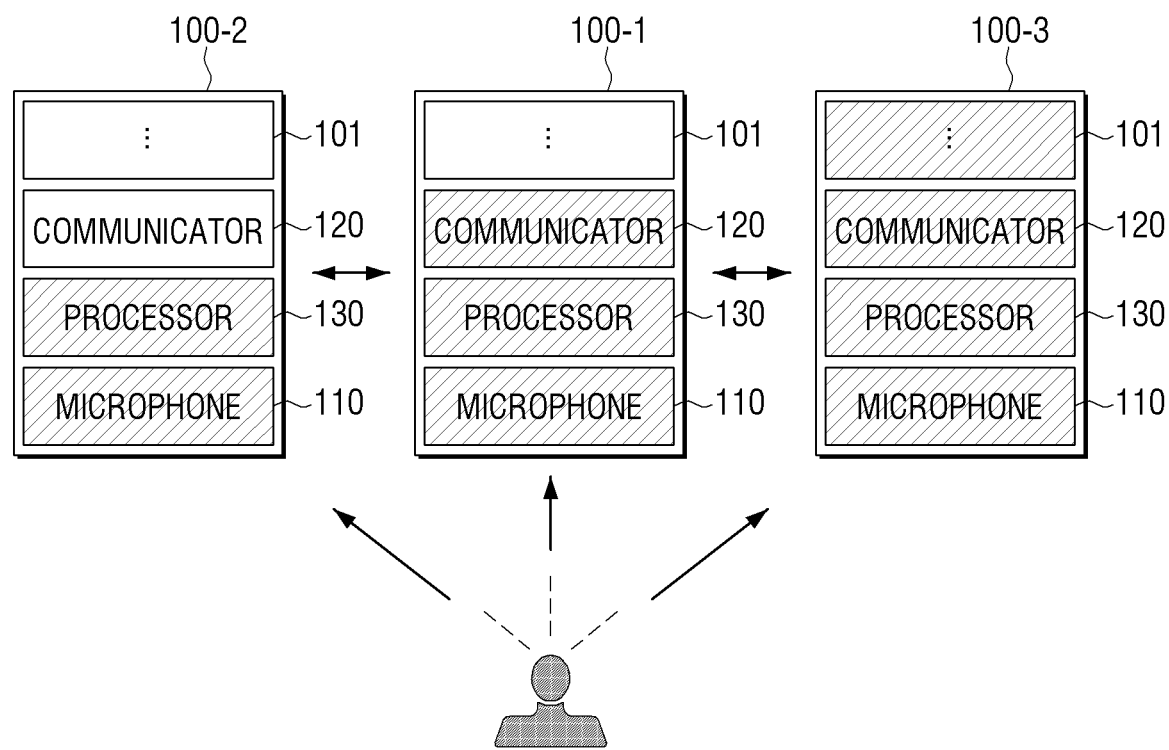
FIG. 9 is a diagram provided to explain an operation in which voice recognition is simultaneously performed in a plurality of electronic apparatuses.

FIG. 9 is a diagram provided to explain a voice recognition operation in a plurality of electronic apparatuses which are operated in different operation modes.

The first electronic apparatus 100-1 may be in a first power saving state in which power is only supplied to the processor 120 and the communicator 130. The second electronic apparatus 100-2 may be in a second power saving state in which power is only supplied to the microphone 110 and the processor 120. The third electronic apparatus 100-3 may be in a normal state in which power is supplied to all components thereof.

The component 101 may refer to a component other than the microphone 110, the processor 130 and the communicator 140 from among all components included in the electronic apparatus 100.

In this state, when the user utters a wake up word (WUW), a microphone of the respective electronic apparatuses 100-1, 100-2 and 100-3 may receive input of a user voice and the processor 130 may identify that a wake up word (WUW), which is a trigger for a voice recognition function, is sensed.

When the wake up word (WUW) is sensed, the respective electronic apparatuses 100-1, 100-2 and 100-3 may activate a communication function, and share whether the wake up word (WUW) is sensed with another apparatus.

In addition, an apparatus to perform voice recognition from among the other apparatuses sensing the wake up word (WUW) may be determined.

In addition, the apparatus 100-1 determined to perform voice recognition may perform voice recognition.

If it is identified that the first electronic apparatus 100-1 is a target apparatus, the first electronic apparatus 100 may change an operation mode to a normal mode and change an operation. In this case, the second electronic apparatus 100-2 is not a target apparatus, and thus may change an activated communicator to be in a deactivated state again.

Figure 10:
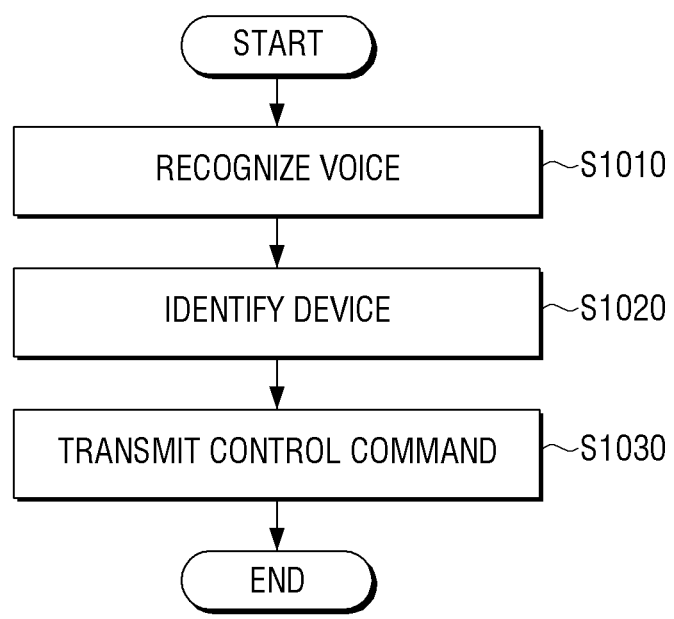
FIG. 10 is a flowchart of a voice recognition method, according to an embodiment.

FIG. 10 is a flowchart of a voice recognition method, according to an embodiment.

Voice recognition corresponding to a voice input may be performed at operation S1010. In detail, it is possible to perform voice recognition using a pre-stored voice recognition algorithm, or transmit a voice signal input to a server and receive the voice recognition result. In an implementation, when a wake up word (WUW) is sensed, it is possible to share whether the wake up word (WUW) is sensed with another electronic apparatus, and to perform voice recognition only in an electronic apparatus having the highest priority from among the electronic apparatuses in which the wake up word (WUW) is sensed.

A target apparatus is identified based on at least one from among apparatus information and function information included in a result of the performed voice recognition, at operation S1020. For example, a target apparatus from among the electronic apparatus and another electronic apparatus to which the electronic apparatus is connectable, based on at least one from among the apparatus information and function information included in the result of the performed voice recognition. For example, when apparatus information is included in the voice recognition result, a target apparatus corresponding to the apparatus information from among the electronic apparatus and another electronic apparatus may be identified. In addition, when function information is included in the voice recognition result, a target apparatus capable of performing a function corresponding to the function information may be determined based on apparatus information of the electronic apparatus and information about the other electronic apparatus.

If a plurality of target apparatuses capable of performing the function are present, one target apparatus may be identified based on history information of the electronic apparatus or the other electronic apparatus or based on a predetermined priority.

A control command corresponding to the voice recognition result is transmitted to the identified target apparatus, at operation S1030. If the identified target apparatus is the apparatus itself, an operation corresponding to the recognition result may be performed.

As described above, the voice recognition method according to an embodiment may determine an apparatus to perform a voice recognition result based on the recognized result, and perform the function only in the corresponding apparatus. Thereby, it is possible to perform an operation that corresponds to a user's intention. The voice recognition of FIG. 10 may be performed, for example, in an electronic apparatus having the configuration of FIG. 2 or FIG. 3, and may also be performed in an electronic apparatus having other configurations.

The above-described voice recognition method according to the embodiment may be implemented in a computer program and provided to display apparatuses. In particular, the computer program including a method for controlling a display apparatus according to embodiments may be stored in a non-transitory computer readable medium and provided therein, and executed by a processor or controller of an apparatus to perform the methods described herein.

The non-transitory computer readable medium refers to a physical medium that stores data semi-permanently rather than storing data for a very short time, such as a register, a cache, a memory or etc., and is readable by an apparatus. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

FIG. 11 is a flowchart of a voice recognition method, according to an embodiment.

Referring to FIG. 11, a user wake up word (WUW) may be sensed at operation S1110.

As a result of sensing, it may be determined whether a plurality of apparatuses have sensed the user wake up word (WUW), at operation S1120. To this end, when a wake up word (WUW) is sensed, it is possible to share whether the wake up word (WUW) is sensed with another electronic apparatus.

As a result of determination, when a plurality of electronic apparatuses have sensed the wake up word (WUW), it may be determined that an electronic apparatus having the highest priority performs voice recognition, at operation S1130. In this case, if the plurality of electronic apparatuses have sensed the wake up word (WUW) and an apparatus itself has a lower priority, a voice recognition operation may not be performed.

If the wake up word (WUW) is sensed only in a current apparatus, it may be determined that voice recognition is performed, at operation S1140.

In this case, analysis of a voice instruction may be executed as a background operation, which may not generate interruption in a screen viewed by the user.

As a result of voice recognition, it may be determined whether it is possible to specify a device to execute a voice command, at operation S1150. In a case in which a device to execute the wake up word (WUW) is present as a connected apparatus, the wake up word (WUW) may be executed in the corresponding device, at operation S1150. In a case in which a device to execute the wake up word (WUW) is not present, a basic operation for the corresponding wake up word (WUW) may be performed at operation S1160.

As described above, the voice recognition method according to an embodiment may determine an apparatus to perform a voice recognition result based on the recognized result, and perform the function in only the corresponding apparatus. Thereby, it is possible to perform an operation that corresponds to a user's intention. The voice recognition of FIG. 10 may be performed, for example, in an electronic apparatus having the configuration of FIG. 2 or FIG. 3, and may also be performed in an electronic apparatus having other configurations.

The above-described voice recognition method according to the exemplary embodiment described above may be implemented in a program and provided to display apparatuses. In particular, the program including the voice recognition method according to example embodiments may be stored in a non-transitory computer readable medium and provided therein.

The foregoing embodiments and advantages are merely exemplary and are not to be construed as limiting the disclosure. The aspects of the disclosure may be readily applied to other types of devices. Also, the description of the embodiments of the disclosure is intended to be illustrative, and not to limit the scope of the claims, and many alternatives, modifications, and variations will be apparent to those skilled in the art.

What is claimed is:

1. An electronic apparatus, comprising:
a communicator;
a memory configured to store apparatus information of a plurality of electronic apparatuses and history information of the plurality of electronic apparatuses,
a microphone configured to receive a voice input; and
a processor configured to:
based on a wake up word (WUW) being identified in the voice input, identify, based on a predetermined priority order, an apparatus to perform a voice recognition from among the plurality of electronic apparatuses receiving the voice input including the WUW;
based on the electronic apparatus being identified as the apparatus to perform the voice recognition, obtain a voice recognition result by performing the voice recognition based on the voice input;
based on the electronic apparatus not being identified as the apparatus to perform the voice recognition, receive the voice recognition result from another electronic apparatus in which the voice recognition is performed based on the predetermined priority order;
based on the apparatus information being included in the voice recognition result, identify whether a number of electronic apparatuses corresponding to the apparatus information among the plurality of electronic apparatuses is plural;
based on the number of electronic apparatuses corresponding to the apparatus information being one, identify the electronic apparatus as a target apparatus for performing a function corresponding to the voice input;
based on the number of electronic apparatuses corresponding to the apparatus information being plural, identify one of the plurality of electronic apparatuses corresponding to the apparatus information as the target apparatus based on the history information of the plurality of electronic apparatuses;

based on the apparatus information not being included in the voice recognition result, and function information which identifies the function being included in the voice recognition result, identify whether a number of electronic apparatuses capable of performing the function among the plurality of electronic apparatuses is plural;

based on the number of electronic apparatuses capable of performing the function being one, identify the electronic apparatus as the target apparatus;

based on the number of electronic apparatuses capable of performing the function being plural, identify one of the plurality of electronic apparatuses capable of performing the function as the target apparatus based on the predetermined priority order;

based on the apparatus information and the function information not being included in the voice recognition result, identify the target apparatus based on the predetermined priority order, and control the communicator to transmit data corresponding to a control command corresponding to the voice recognition result to the target apparatus.

2. The electronic apparatus as claimed in claim 1, wherein the processor is configured to, based on a plurality of target apparatuses being capable of performing the function, identify one target apparatus based on the history information of the plurality of target apparatuses.

3. The electronic apparatus as claimed in claim 2, wherein the processor is configured to identify the target apparatus from among the plurality of target apparatuses based on voice recognition history information performed in each of the plurality of target apparatuses.

4. The electronic apparatus as claimed in claim 2, wherein the processor is configured to identify the target apparatus from among the plurality of target apparatuses based on current time information and the history information.

5. The electronic apparatus as claimed in claim 1, wherein the processor is configured to update the apparatus information of the plurality of electronic apparatuses at a predetermined time.

6. The electronic apparatus as claimed in claim 1, wherein the processor is configured to:
control the communicator to transmit the voice input received through the microphone to a server; and
identify the target apparatus by using a voice recognition result of the voice input received from the server.

7. A method for voice recognition in an electronic apparatus, the method comprising:
based on a wake up word (WUW) being identified in a voice input, identifying, based on a predetermined priority order, an apparatus to perform a voice recognition from among a plurality of electronic apparatuses receiving the voice input comprising the WUW;
based on the electronic apparatus being identified as the apparatus to perform the voice recognition, obtaining a voice recognition result by performing the voice recognition based on the voice input;
based on the electronic apparatus not being identified as the apparatus to perform the voice recognition, receiving the voice recognition result from another electronic apparatus in which the voice recognition is performed based on the predetermined priority order;
based on apparatus information being included in the voice recognition result, identifying whether a number of electronic apparatuses corresponding to the apparatus information among the plurality of electronic apparatuses is plural;

based on the number of electronic apparatuses corresponding to the apparatus information being one, identifying the electronic apparatus as a target apparatus for performing a function corresponding to the voice input;

based on the number of electronic apparatuses corresponding to the apparatus information being plural, identifying one of the plurality of electronic apparatuses corresponding to the apparatus information as the target apparatus based on history information of the plurality of electronic apparatuses;

based on the apparatus information not being included in the voice recognition result, and function information which identifies the function being included in the voice recognition result, identifying whether a number of electronic apparatuses capable of performing the function among the plurality of electronic apparatuses is plural;

based on the number of electronic apparatuses capable of performing the function being one, identifying the electronic apparatus as the target apparatus;

based on the number of electronic apparatuses capable of performing the function being plural, identifying one of the plurality of electronic apparatuses capable of performing the function as the target apparatus based on the predetermined priority order;

based on the apparatus information and the function information not being included in the voice recognition result, identifying the target apparatus based on the predetermined priority order; and transmitting data corresponding to a control command corresponding to the voice recognition result to the target apparatus.

8. The method for voice recognition as claimed in claim 7, wherein the identifying comprises, based on a plurality of target apparatuses being capable of performing the function, identifying one target apparatus based on the history information of the plurality of target apparatuses.

9. The method for voice recognition as claimed in claim 7, wherein the identifying comprises, based on a plurality of target apparatuses being capable of performing the function, identifying the target apparatus from among the plurality of target apparatuses based on a predetermined priority.

10. A non-transitory computer-readable medium recording instructions for execution by a processor of an electronic apparatus to cause the electronic apparatus to perform operations comprising:
based on a wake up word (WUW) being identified in voice input, performing voice recognition of the voice input and obtain a first voice recognition result of the voice input,
receiving a second voice recognition result of the voice input from an external electronic apparatus among a plurality of electronic apparatuses receiving the voice input comprising the wake up word (WUW);
determining a control command to perform a function corresponding to the voice input based on the first voice recognition result and the second voice recognition result;
based on apparatus information being included in the first voice recognition result and the second voice recognition result, identifying whether a number of electronic apparatuses corresponding to the apparatus information among the plurality of electronic apparatuses is plural;

based on the number of electronic apparatuses corresponding to the apparatus information being one, identifying the electronic apparatus as a target apparatus;

based on the number of electronic apparatuses corresponding to the apparatus information being plural, identifying one of the plurality of electronic apparatuses corresponding to the apparatus information as the target apparatus based on history information of the plurality of electronic apparatuses;

based on the apparatus information not being included in the first voice recognition result and the second voice recognition result, and function information which identifies the function being included in the first voice recognition result and the second voice recognition result, identifying whether a number of electronic apparatuses capable of performing the function among the plurality of electronic apparatuses is plural;

based on the number of electronic apparatuses capable of performing the function being one, identifying the electronic apparatus as the target apparatus;

based on the number of electronic apparatuses capable of performing the function being plural, identifying one of the plurality of electronic apparatuses capable of performing the function as the target apparatus based on a predetermined priority order;

based on the apparatus information and the function information not being included in the first voice recognition result and the second voice recognition result, identifying the target apparatus based on the predetermined priority order; and transmitting data corresponding to the control command corresponding to the first voice recognition result and the second voice recognition result to the target apparatus.

* * * * *